Figure 1:
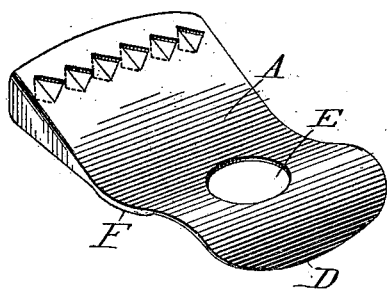

No. 631,259. Patented Aug. 15, 1899.
R. M. PANCOAST.
IMPLEMENT FOR SLITTING GREEN CORN ON THE COB.
(Application filed Apr. 7, 1899.)

(No Model.) 3 Sheets—Sheet 1.

Witnesses:
D. W. Edelin.
Clifford S. Berryman

Inventor:
Richard M. Pancoast.
by F. P. Stebbins
Atty.

No. 631,259. Patented Aug. 15, 1899.
R. M. PANCOAST.
IMPLEMENT FOR SLITTING GREEN CORN ON THE COB.
(Application filed Apr. 7, 1899.)

(No Model.) 3 Sheets—Sheet 2.

Witnesses:
O. W. Edelin.
Clifford Berryman

Inventor:
Richard M. Pancoast.
by F. E. Stebbins
Atty.

No. 631,259. Patented Aug. 15, 1899.
R. M. PANCOAST.
IMPLEMENT FOR SLITTING GREEN CORN ON THE COB.
(Application filed Apr. 7, 1899.)

(No Model.) 3 Sheets—Sheet 3.

Witnesses:
D. W. Edelin.
Clifford K. Berryman

Inventor:
Richard M. Pancoast.
by F. E. Stebbins,
Atty.

UNITED STATES PATENT OFFICE.

RICHARD M. PANCOAST, OF CAMDEN, NEW JERSEY.

IMPLEMENT FOR SLITTING GREEN CORN ON THE COB.

SPECIFICATION forming part of Letters Patent No. 631,259, dated August 15, 1899.

Application filed April 7, 1899. Serial No. 712,093. (No model.)

*To all whom it may concern:*

Be it known that I, RICHARD M. PANCOAST, a citizen of the United States, residing at Camden, in the county of Camden and State of New Jersey, have invented certain new and useful Improvements in Implements for Slitting Green Corn on the Cob, of which the following is a specification.

The object of my invention is the production of an implement for slitting green corn on the cob which shall be very simple in construction, and hence cheap in first cost, which shall be strong and durable and provided with means for protecting the teeth thereof, which shall be adapted for individual use at the table and for general use in the kitchen and factory, and which withal shall possess many other desirable features and characteristics suiting it for the function it is to perform.

With the above object or end in view my invention consists, first, in a corn-slitter made, preferably, of tin or other sheet metal and having a series of teeth struck up from the body of the metal and integral therewith.

Further, it consists in a slitter made, preferably, of sheet metal, provided with a series of teeth struck up from the body of the metal and having guiding or protecting ears or flanges.

Further, it consists in a slitter made, preferably, of sheet metal, having a series of teeth integral therewith struck up from the body of the metal and provided with a handle adapted to be grasped between the thumb and finger or by the hand when in use.

Further, it consists in a slitter made, preferably, of sheet metal and having two series of teeth staggered or out of line and integral with the body of the metal.

Further, it consists in a slitter made of sheet metal and having a series of triangular teeth integral with and struck up from the body of the metal.

Finally, it consists in certain novelties of construction and combinations of parts hereinafter described, and set forth in the claims.

The accompanying drawings illustrate seventeen examples of the physical embodiment of my invention constructed by the best modes I have so far devised for the application of the principle.

Figure 2:
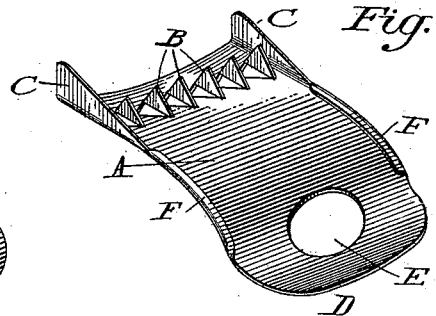
Figure 3:
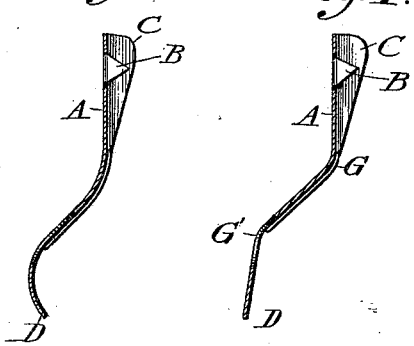
Figure 4:
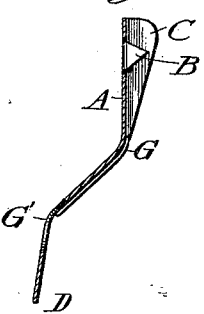
Figure 5:
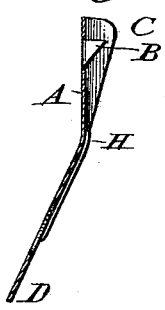
Figure 6:
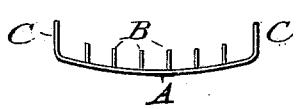
Figure 7:
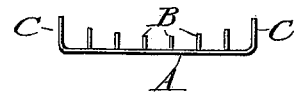
Figure 8:
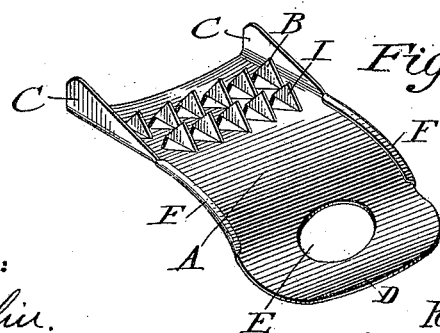
Figure 15:
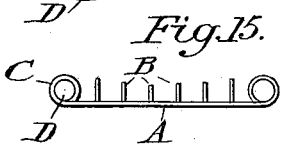
Figure 16:
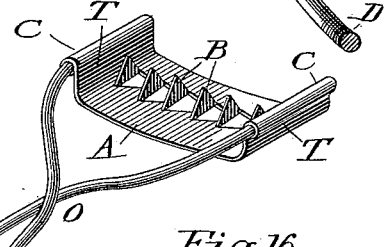
Figure 17:
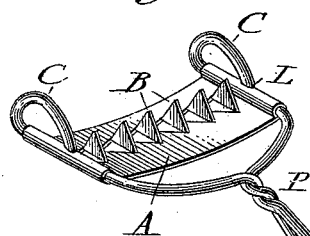
Figure 18:
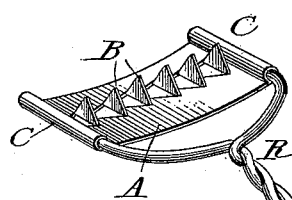
Figure 19:
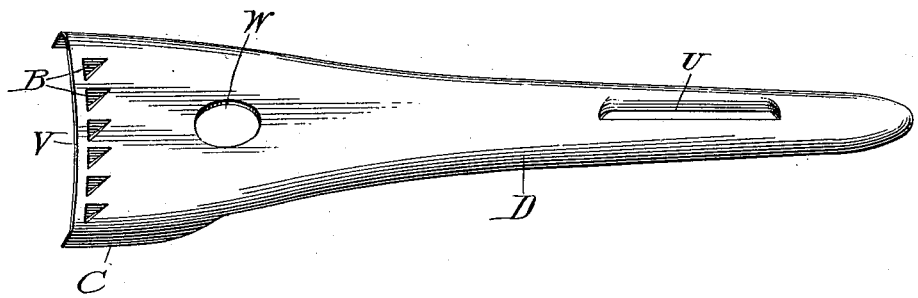

Figure 1 is a back view in perspective of a simple form of the implement made of sheet metal. Fig. 2 is a reverse perspective view of the slitter shown in Fig. 1. Fig. 3 is a longitudinal section of Fig. 2, showing the reversely-curved handle. Fig. 4 is a sectional view of a slitter provided with a handle bent reversely at two points in its length. Fig. 5 shows a slitter in section, having a handle bent at an angle to the body portion. Fig. 6 is an end view of a slitter having a curved back and teeth of uniform length. Fig. 7 is an end view of another form in which the back is flat and the teeth of different lengths. Fig. 8 is a perspective view of a slitter having two rows of staggered teeth. Figs. 9, 10, 11, 12, 13, and 14 illustrate types of slitters in which the handles consist of wires bent to shape and supporting sheet-metal plates having teeth. Fig. 15 is an end view of a slitter similar to that shown in Fig. 13, but having the teeth of different lengths. Fig. 16 illustrates a slitter having a long wire handle and the wire thereof bent across itself. Figs. 17 and 18 illustrate forms in which the wires of the handles are twisted; and Fig. 19 is a view of a combination implement having a parer, an edged point, and teeth for slitting, the same being substantially of the form shown.

Referring generally to all the examples, the letter A designates sheet metal, which may be tin, steel, or other metal or composition of metals.

B are the teeth, made in the body of the metal and preferably in series, each being formed by cutting two slots which meet at an angle and then turning up the part severed to a position at right angles to the plane or body of the metal.

C are the guiding or protecting ears or flanges, and D are the handles.

The first example, Figs. 1 and 2, is made of a single piece of sheet metal having near one end the teeth in series and adjacent the other end a hole E, which serves to support the slitter on a nail or hook when not in use. The guiding or protecting ears or flanges C are of approximately the height of the teeth or, if desired, they may extend somewhat above the plane of the points of the series of teeth. F F are portions of the edges of the metal, each turned through an angle of one hundred and eighty degrees, so as to form curved surfaces which will not injure the hand when the implement is grasped and manipulated and which also stiffen the implement lengthwise and prevent bending of the same when in use. The handle D in the case is integral and reversely curved, as clearly shown in section, Fig. 3, whereby the fingers will occupy position out of contact with the ear of corn when the act of slitting is being performed.

The second example, Fig. 4, differs from the first in having the handle bent reversely at G G' to form obtuse angles and also having the slope of the teeth relative to the body of the metal less at the front than at the rear.

The third example, Fig. 5, is like unto the first example, except in the shape of the handle and of the form of the teeth. The former is bent at H, so as to throw the free end some distance outward from the plane of the body portion of the slitter, and the latter are formed so that the front sides of the teeth are perpendicular to the body of the metal.

The fourth example, Fig. 6, illustrates the back of the slitter and along with it the series of teeth curved and the flanges C made wider than in the prior examples.

The fifth example, Fig. 7, has a flat back and the teeth increasing in length from the center to the sides, this disposition being desirable to secure the proper curvature of the series of teeth and adapt them to the contour of the ear of corn.

The sixth example, Fig. 8, is provided with a second series of teeth I, out of line with the series adjacent the end of the slitter. This construction insures the cutting of every grain or kernel in drawing the implement lengthwise of the ear a single time.

Figure 9:
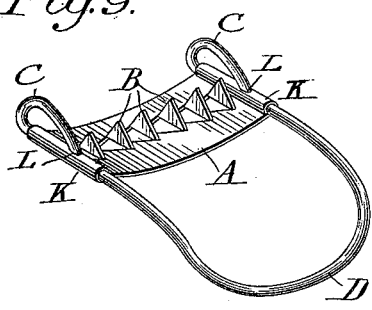

The seventh example, Fig. 9, has a handle made of an integral piece of wire bent on a curve, as shown, and with the edges K K of the sheet metal bent around its extended ends and secured by solder or otherwise. The guiding or protecting ears in this instance consist of the free ends of the wire turned and looped, and they may be soldered at points L L to the body of the slitter, if so desired.
The eighth example, Fig. 10, differs from the seventh only in having the handle bent at M.

Figures 10, 11:
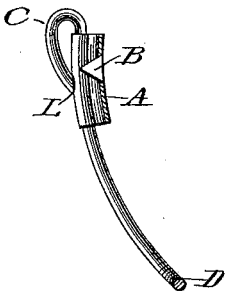

The ninth example, Fig. 11, differs from the seventh in having the sheet-metal portion, as well as the handle, bent on a curve from end to end.

Figure 12:
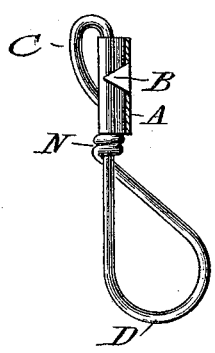

The tenth example, Fig. 12, has the sheet-metal body portion attached, as hereinbefore described, to the parallel ends of two wires, and the opposite ends of said wires being looped and coiled around themselves at the points N.

Figure 13:
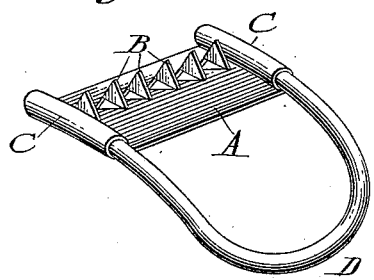

The eleventh example, Fig. 13, is quite like the form shown in Fig. 9, but differs, essentially, in having the handles made of larger wire, the same being of such diameter that when the edges of the sheet metal are secured to the free ends of the wire the parts above the plane of the sheet metal supporting the teeth will constitute guiding or protecting ears of a height about equal to the length of the teeth.

Figure 14:
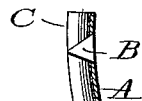

The twelfth example, Fig. 14, differs from the eleventh only in having both the sheet-metal and wire handles bent on a curve throughout their lengths.

The thirteenth example, Fig. 15, is like the form shown in Fig. 13, except that the teeth increase in length from the center to the sides, so that the extreme points will lie in a curved line and for the purpose hereinbefore specified.

The fourteenth, fifteenth, and sixteenth examples, Figs. 16, 17, and 18, are quite similar one to another, differing mainly in the construction of the handles. In Fig. 16 the wire is bent across itself at O, in Fig. 17 it is twisted twice or more at P, and in Fig. 18 the wire is twisted upon itself almost its entire length from R to S. The guiding or protecting ears in Fig. 16 are formed in part by offsetting the metal at points T T, while in Figs. 17 and 18 they are similar to those already described in connection with other examples.

The seventeenth example, Fig. 19, is made of a single piece of sheet-metal struck up to the shape shown and tapering from one end to the other. Near the smaller end the implement is semicircular in cross-section. At the extreme end it is brought to a point. Near the smaller end a longitudinal slit U is made in the body of the metal and one edge raised above the plane of the opposite edge, which former when sharpened serves as a parer. In this example the teeth are located as near as possible to the edge V, and inasmuch as the implement is straight approximately from end to end and must be held at an angle to an ear of corn when used in slitting the teeth are made as shown in Fig. 5— that is, with one edge perpendicular to the plane of the body of the metal. By such construction the points of the teeth are brought quite close to the edge V and can engage the grains of corn and operate effectively when the implement is held at an angle to the ear.

If desired, a hole W may be made adjacent one end of the tool by which to support it on a nail or hook when not in use.

It will be understood that all the examples have certain elements in common. Each has teeth made in the body of the sheet-metal portion, guiding or protecting ears or flanges, and a handle. The teeth in practice should be made about one-eighth of an inch or three-sixteenths of an inch high and three-sixteenths of an inch apart, though these dimensions may be varied at will. The number of teeth in a series is shown as six in all the examples, but more or less may be used. When thick sheet metal is employed, the metallic teeth may be sharpened at the edges and points; but with thin metal this will not be necessary.

The guiding or protecting ears or flanges of the several examples differ in form only, the function of all being the same—that is, to guide the slitter on the ear and especially to protect the teeth from injury when the implement is being washed or thrown or moved about.

The handles in the several forms are fashioned so as to adapt them for particular uses. The shapes in Figs. 1 to 15, inclusive, are for individual or table use and can consequently be held conveniently between the finger and thumb while being drawn lengthwise of the ear of corn, the holes E in several of these examples and the open space between the bent wire in the others allowing the thumb and finger to meet and effecting a firmer grasp of the implement. The shapes in Figs. 16 to 19, inclusive, are adapted for kitchen or factory use, and hence have longer handles, which can be grasped by the hand.

The implement shown in Fig. 19 is of a combination nature and is for use not only as a slitter, but also as a parer for removing the skins of potatoes and for removing the eyes of the same.

From the illustrations and the descriptions of the several examples it becomes apparent that I have produced an implement which fulfils all the conditions set forth as the object or end of my invention and likewise possesses other desirable features and characteristics. However, while I have shown the numerous examples of the physical embodiment of the improvements, such examples in their details of form and specific construction are not exhaustive, inasmuch as many colorable changes in shape may be introduced by the manufacturer without constituting a substantial departure.

What I claim is—

1. An implement for slitting green corn on the cob consisting of a piece of sheet metal suitably fashioned and having a series of plain teeth struck up from the body of the metal adjacent but not in one of the edges thereof; each of said teeth being located entirely in a plane at right angles to the plane of the body of the metal; in substance as set forth.

2. An implement for slitting green corn on the cob consisting of sheet metal suitably fashioned and having a series of plain teeth, each triangular in shape, struck up from the body of the metal adjacent but not in one edge thereof; said teeth being entirely in planes substantially perpendicular to the plane of the body of the metal; in substance as set forth.

3. An implement for the purpose described, consisting of sheet metal having a plurality of plain teeth struck up from the body of the metal adjacent but not in one edge thereof; said teeth being entirely in planes substantially perpendicular to the plane of the body of the metal and also staggered; in substance as set forth.

4. An implement for the purpose described consisting of sheet metal suitably fashioned, having a series of plain teeth struck up from the body of the metal adjacent but not in one edge, and also provided with guiding or protecting ears or flanges; said teeth being entirely in planes substantially perpendicular to the plane of the body of the metal, and said ears or flanges located to the right and left of the series of teeth; in substance as set forth.

5. An implement for the purpose described consisting of sheet metal suitably fashioned, having a series of plain teeth struck up from the body of the metal adjacent but not in one edge, and also provided with a handle; each of said teeth being turned up so as to entirely occupy a plane substantially at right angles to the body of the metal from which the teeth are struck; in substance as set forth.

In testimony whereof I affix my signature in presence of two witnesses.

RICHARD M. PANCOAST.

Witnesses:
   CHAS. T. PANCOAST,
   RICH. M. PANCOAST, Jr.